June 7, 1966   D. F. ELWELL ETAL   3,254,537
CONTROL APPARATUS

Filed May 18, 1962   4 Sheets-Sheet 1

INVENTORS.
DONALD F. ELWELL
RALPH D. ORMSBY
BY Roger W. Jensen
ATTORNEY.

June 7, 1966  D. F. ELWELL ETAL  3,254,537
CONTROL APPARATUS
Filed May 18, 1962  4 Sheets-Sheet 2

INVENTORS.
DONALD F. ELWELL
RALPH D. ORMSBY
BY
ATTORNEY.

June 7, 1966  D. F. ELWELL ETAL  3,254,537
CONTROL APPARATUS
Filed May 18, 1962  4 Sheets-Sheet 3
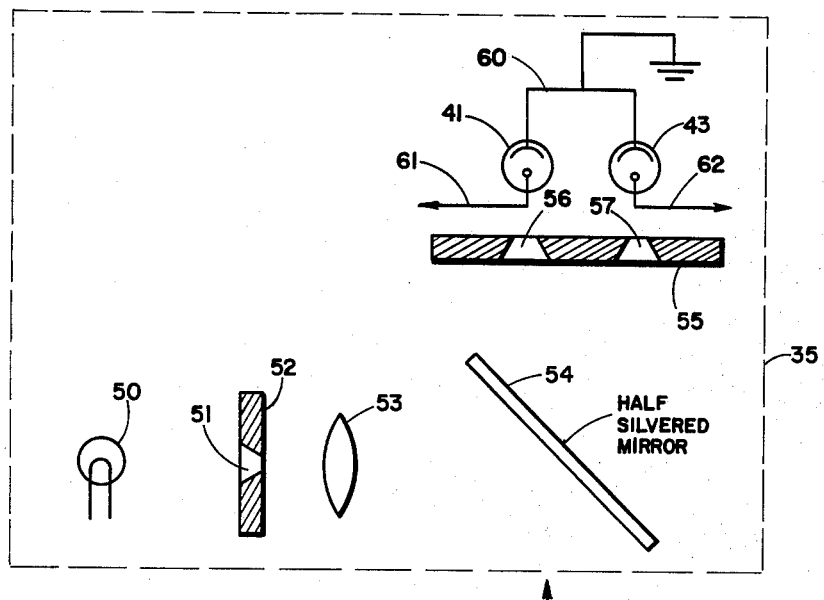
FIG. 4
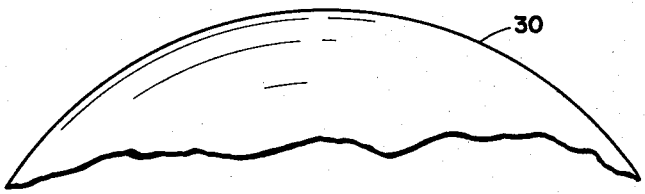
FIG. 3
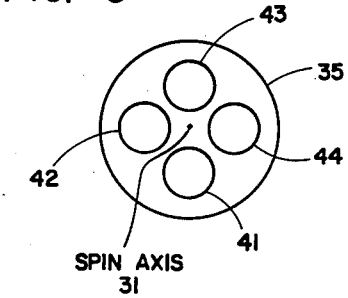
INVENTORS.
DONALD F. ELWELL
RALPH D. ORMSBY
BY
ATTORNEY.

INVENTORS.
DONALD F. ELWELL
RALPH D. ORMSBY
BY Roger W. Jensen
ATTORNEY.

United States Patent Office 3,254,537
Patented June 7, 1966

3,254,537
CONTROL APPARATUS
Donald F. Elwell, Columbia Heights, Minn., and Ralph D. Ormsby, Ann Arbor, Mich., assignors to Honeywell Inc., a corporation of Delaware
Filed May 18, 1962, Ser. No. 195,820
9 Claims. (Cl. 74—5.6)

This invention pertains to an arrangement, in combination with a support member and a spherically shaped rotor member universally supported on the support and adapted to spin relative to the support about a spin axis, for sensing and measuring relative rotation between the support member and the rotor member about any axis which is at an angle to the spin axis.

The invention has specific application to the field of gyroscopic instruments comprising in part a spherically shaped rotor element universally supported by suitable means on a support. The invention has special applicability where the spherically shaped rotor element as above described is further characterized by being of the non-preferred spin axis type as distinguished from the preferred spin axis type rotor.

There have been prior arrangements for measuring relative rotation about axes transverse to the spin axis between a spherically shaped rotor and a support. One such prior arrangement is that shown in the Kunz Patent 2,959,060, granted November 8, 1960 and assigned to the same assignee as the present application. This prior arrangement utilizes a spherically shaped rotor having a speical pattern applied to the rotor surface, the pattern being fixed with respect to the spin axis. Another prior arrangement is shown in the Werndl Patent 2,857,767, granted October 28, 1958. This prior arrangement utilizes an optical flat on the rotor element for coaction with a source of light, relative rotation of the rotor and its support about an axis transverse to the spin axis causing a change in the reflection of the light off of the optical flat, the change being sensed by detection means.

Both of the prior art arrangements described are limited to use with rotors of the preferred spin axis type. A preferred spin axis type rotor is one where the body axes of the rotor are fixed with respect to the spin axis. An example of this type of rotor would be a nonhomogeneous rotor having concentration of mass arranged in a circumferential or equatorial belt or band. In some applications it is desired to use spherically shaped rotors which are of the non-preferred spin axis type, i.e., one where the body axes of the sphere can and will shift with respect to the spin axis. An example of this type of rotor would be a substantially perfectly symmetrical and homogeneous rotor. In a rotor of this type it is known that the body axes can and will shift with respect to the spin axis due to minute transient effects caused by temperature changes or other factors.

Also in some spherical rotor applications such as gyroscopes using sphercially shaped rotors, it is desired to avoid having any pattern on the surface of the rotor. Patterns add complexity to the manufacturing operation especially where great accuracy is required. Further, with some type of rotor support systems, the patterns can introduce undesirable variables which have an adverse effect on the desired support. In the same sense the prior art techniques of using optical flats on the rotor are unsatisfactory.

The present invention provides a unique means for measuring any relative rotation about an axis transverse to the spin axis between a spherically shaped rotor and its support means. The present invention works admirably for measuring such rotation of a perfectly homogeneous and symmetrical spherically shaped rotor, i.e., non-preferred spin axis type. The present invention provides a radiation sensing means which views a spin axis end of the rotor and produces a signal indicative of relative displacement (transverse to the spin axis) of the sensing means away from the spin axis of the spinning rotor by being responsive to the velocity of relative movement between the sensing means and the portion of rotor surface viewed. The radiation sensing means as indicated is normally oriented so that it views or straddles a spin axis end of the rotor. The radiation sensing means is mounted on a suitable arrangement such as a pair of gimbals with each gimbal having motor means or the like for rotating the same. The signals produced by the radiation sensing means are used to actuate the motor means in a servo system so as to servo or slave the radiation sensing means to the spin axis of the rotor. In this manner the radiation sensing means is maintained in substantial register with the spin axis or pole portion of the rotor surface. Suitable pick-offs or readout means are associated with the gimbals for providing signals indicative of gimbal position with respect to a base and in this manner the signals are also indicative of relative rotation between the rotor and the base about axes transverse to the spin axis.

It is an object of the invention therefore to provide an improved means for measuring relative rotation between a spherically shaped spinning rotor and a support about axes transverse to the spin axis.

Other objects of the invention will be understood from a reading of the complete specification and appended claims, in conjunction with the drawings in which:

FIGURE 3 is a more detailed view of one radiation sensing means useable with the present invention;

FIGURE 4 is a schematic representation of one portion of a radiation sensing means which may be used with the present invention;

Figure 1:
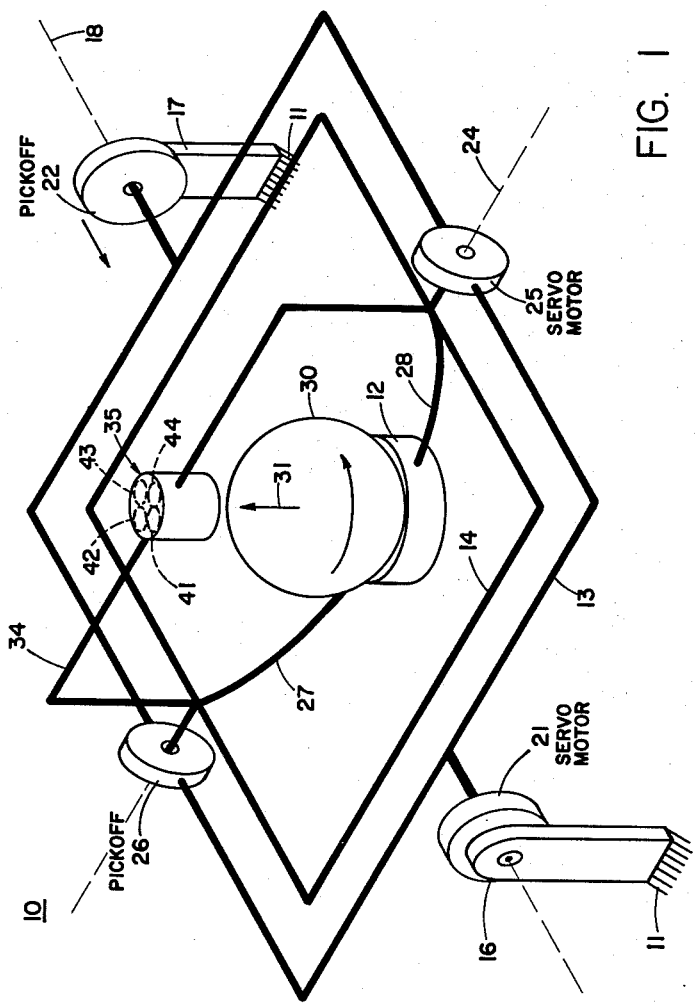
FIGURE 1 is a schematic isometric view of a gyroscopic apparatus utilizing the teaching of the invention.

Referring to FIGURE 1 the reference numeral 10 generally depicts a gyroscopic apparatus comprising a base means 11 and a suitable support 12 mounted on a pair of gimbals 13 and 14 on base 11 for relative rotation about a pair of mutually perpendicular axes. More specifically a gimbal 13 is supported for rotation by a pair of base posts 16 and 17, the rotational axis being identified by reference numeral 18. A suitable servomotor means 21 connected between post 16 and gimbal 13 is effective when actuated to cause relative rotation between gimbal 13 and base 11 about axis 18. A suitable pickoff or readout means 22 connected between post 17 and gimbal 13 is effective to measure and produce signals indicative of relative rotation between base means 11 and gimbal 13 about said axis 18. Gimbal 14 is mounted for rotation with respect to gimbal 13 by a suitable means, the rotational axis being identified by reference numeral 24 and said axis 24 being perpendicular to axis 18. A suitable servomotor means 25 connected between gimbals 13 and 14 is effective when actuated to produce relative rotation between gimbals 13 and 14 about axis 24. A suitable pickoff or readout means 26 also connected between gimbals 13 and 14 is effective to measure and produce signals indicative of said relative rotation between gimbals 13 and 14 about axis 24.

Support 12 is depicted in FIGURE 1 as a cup-like member attached to gimbal 14 by a pair of arms 27 and 28. As shown in FIGURE 1, the support 12 is associated with a substantially spherically shaped rotor element 30 which is adapted to spin about a spin reference axis 31. The support of the rotor 30 by support means 12 may be of any suitable type, an air bearing being schematically depicted in the patent drawings. It will be understood by those skilled in the art that other arrangements for supporting a spherically shaped rotor may be used, for example, an electrostatic suspension as is broadly taught by the Nordsieck Patent 3,003,356, which was granted October 10, 1961. Specific details of such arrangements have not been shown since they form no direct part of the present invention.

A U-shaped bracket member 34 depicted as being an integral part of gimbal 14 supports at a central portion thereof a radiation sensing means 35 to be described in further detail below. As will be explained, the radiation sensing means 35 and the rotor 30 are orientable and are normally oriented so that the radiation sensing means views or sees a spin axis or pole portion of the surface of the rotor, this arrangement also being described as an end axis pickoff or viewing means. The "pole portion" of a spherically shaped rotor is herein defined as a portion of the rotor surface of a spherically shaped rotor through which the spin reference axis or spin axis or spin vector extends. As will be explained in more detail below, the radiation sensing means 35 is effective to produce signals indicative of relative displacement (transverse to the spin axis) of the sensing means away from the spin axis 31 of the spinning rotor 30 by being responsive to the velocity of relative movement between the sensing means 35 and the pole portion of the rotor surface, these signals being applied to the servomotor means 21 and 25 in a sense so as to servo or slave the sensing means 35 to the spin axis 31.

Figure 2:
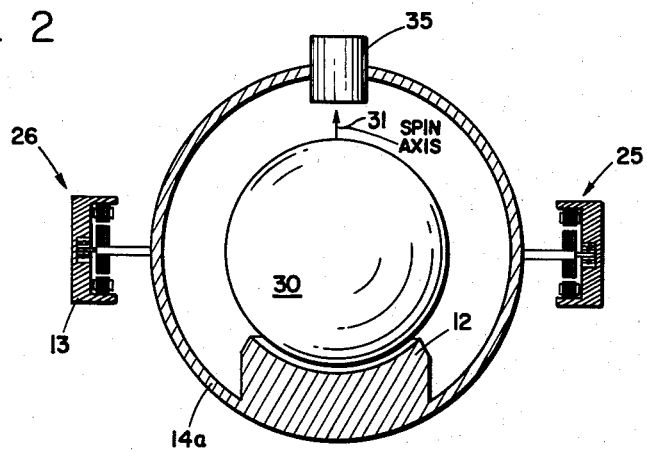
FIGURE 2 is a more detailed view of a portion of the apparatus depicted in FIGURE 1.

FIGURE 2 shows a slightly modified arrangement from that shown in FIGURE 1 in that the gimbal supported by outer gimbal 13 is a generally hollow sperical element identified by reference numeral 14a. The spherical shell 14a has associated with it the support means for supporting the rotor 30, the support means again being schematically indicated by an air bearing arrangement 12. It will also be understood that suitable means not shown are provided for causing the rotor to spin about the spin axis 31. The spherical shell 14a also serves as a means for mounting the radiation sensing means 35.

Referring once again to FIGURE 1, four separate elements 41, 42, 43 and 44 are shown as being contained within the radiation sensing means 35. These elements are shown on a larger scale in FIGURE 3 wherein it will be noted that they are arranged in quadrature with respect to the spin axis 31. Thus elements 41 and 43 constitute a first pair of sensors which are normally oriented so as to straddle the spin axis 31 and sensors 42 and 44 constitute a second pair of elements arranged in quadrature with respect to elements 41 and 43 and further arranged and oriented so as to straddle the spin axis 31. Elements 41–44 may be any suitable radiation sensing means such as phototransistors, photovoltaic cells, or other photoelectric sensing means. In the specific arrangements depicted in FIGURES 4 and 5, photocells are depicted, it being understood that this is for purposes of explanation and not by means of limitation. It will further be understood by those skilled in the art that the expression "radiation sensing means" as used herein will include a wide range of technologies. The invention is herein specifically described utilizing "light" type of radiation but the teaching applies equally to other radiation arrangements.

FIGURE 4 shows a schematic representation of a portion of the radiation sensing means 35 described above in connection with FIGURES 1–3. More specifically only one pair of radiation sensors are shown in FIGURE 4 because of the two dimensional nature of the drawing. It will be understood, however, that the remaining pair of radiation sensors would be simultaneously functioning. In FIGURE 4 a portion of the rotor surface of rotor 30 is shown. More specifically a pole portion of the rotor surface is depicted, the spin axis again being identified by reference numeral 31. A suitable source of light such as a lamp 50 illuminates a slit or aperture 51 in a mask 52. Light that passes through the slit or opening 51 is collimated by a suitable lens 53 and such collimated light is directed against a suitable beam splitter having a semireflecting surface such as a half-silvered mirror 54. A portion of the collimated light passes through the mirror 54. The remaining light is reflected downwardly to impinge against or to illuminate the pole portion including the spin axis 31 of the rotor 30. A portion of the light is reflected upwardly against the mirror 54 and a portion thereof passes therethrough against a second mask 55 having a pair of slits or apertures 56 and 57 therein. The radiation sensing elements 41 and 43 are positioned by suitable means in register with the openings 56 and 57. The radiation sensing elements 41 and 43 are each depicted as having a cathode element and an anode element. The cathodes are connected together by a suitable means 60 and the anodes respectively have associated therewith leads 61 and 62. As indicated, it will be understood that the remaining sensors 42 and 44 are arranged in quadrature and likewise would be receiving light reflected from the surface of the rotor 30 through the same optical system shown in FIGURE 4, suitable mask and aperture means being provided to permit light to impinge against said sensors 42 and 44.

Figure 6:
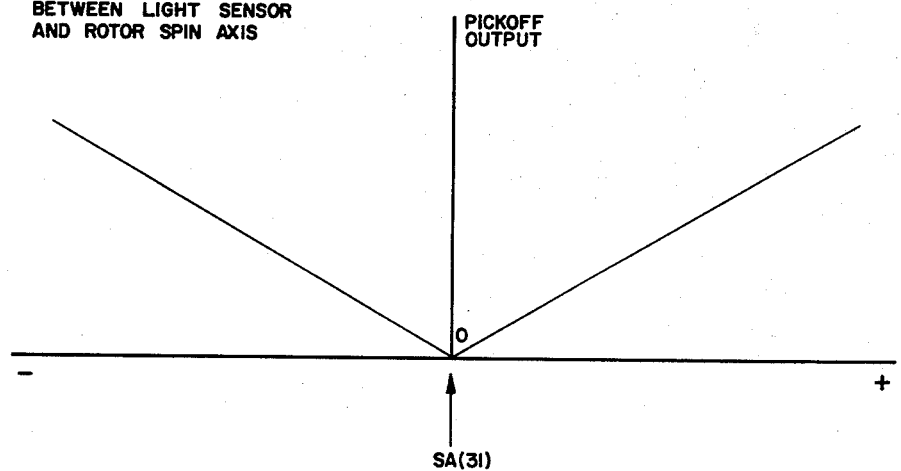
FIGURE 6 is a graph showing the relationship between pickoff output signal and relative lateral displacement between the radiation sensing assembly and the rotor spin axis.

FIGURE 6 depicts the output of a typical photocell after rectification or detection. Referring to FIGURE 6, it will be noted that when a photocell is positioned so as to be in register with the spin axis 31 of the rotor, the output thereof is at a null. As relative lateral displacement between the photocell sensor and the spin axis occurs, there is an increasing output from the sensor. This has been found to be a function of the relative velocity of movement between the photocell sensor and the portion of the rotor surface viewed thereby. One explanation of this is that there is a non-uniform rotor surface reflectivity even for so called homogeneous rotors having no specific pattern. Thus, even in the case of a highly polished spherically shaped rotor, there would be discreet blemishes on the rotor surface which would cause variations in reflectivity. The coaction between the rotor blemishes and the photocell sensor has been found to produce an increasing output from the sensor as the distance between the axis of the sensor and the spin axis increases. The signal output of the sensor per se is of an alternating nature and accordingly some suitable rectification or detection is required. Various detecting arrangements may be used, one of which is depicted in FIGURE 5.

Figure 5:
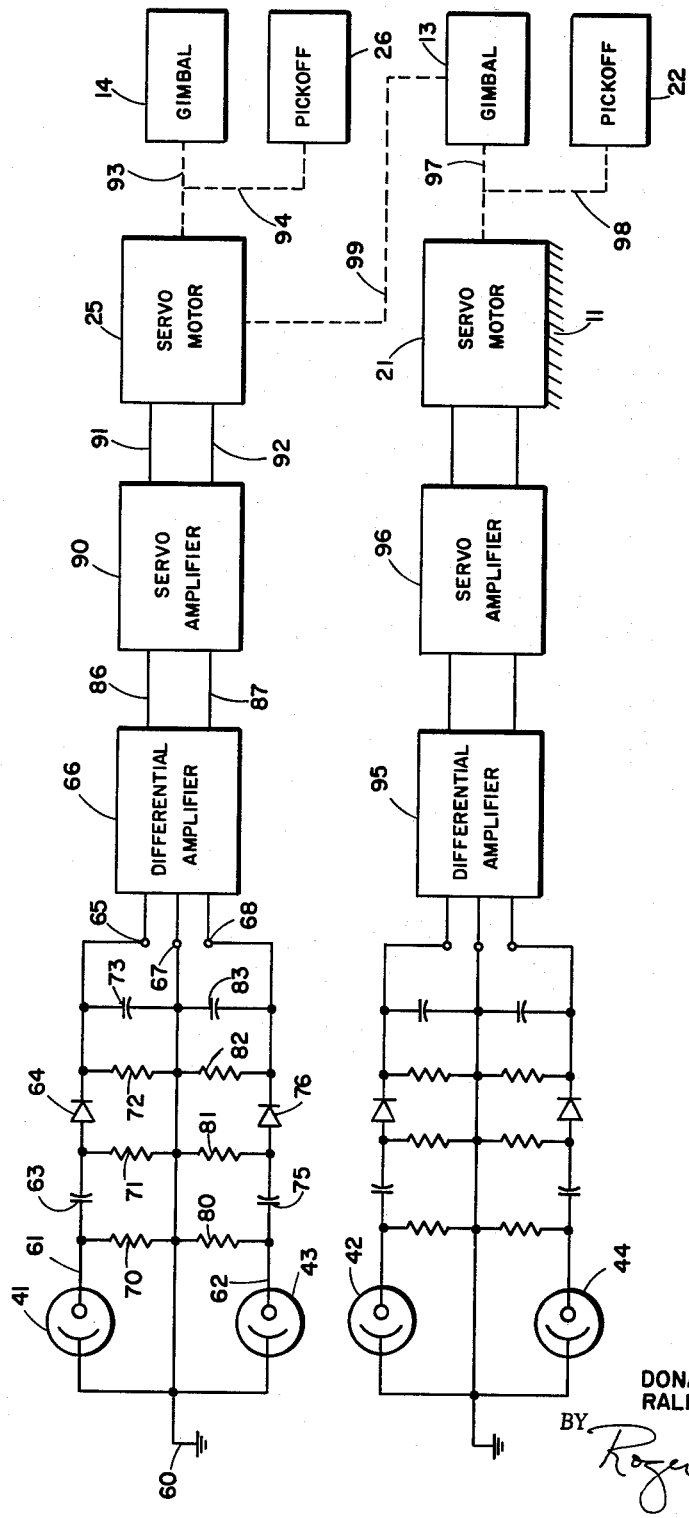
FIGURE 5 is a system block diagram of one embodiment of the present invention.

Referring now to FIGURE 5, an overall system is depicted in general block diagram form with some specific details shown for one embodiment of a signal detection means. Sensors 41 and 43 are arranged in a first pair and sensors 42 and 44 are arranged in a second pair. The cathodes of sensors 41 and 43 are connected together and are connected to ground 60. The anode of sensor 41 is connected by its lead 61 through a series connected condenser 63 and rectifier 64 to a first input 65 of a suitable differential amplifier 66 of the type well known to those skilled in the art. Amplifier 66 has a second input 67 which is grounded and a third input 68. The rectification or detection means for photocell 41 further includes a resistor 70 connected between ground 60 and lead 61; a resistor 71 connected between the junction of capacitor 63 and rectifier 64 and ground 60; a resistor 72 connected between input 65 and ground 60; and a capacitor 73 connected between input 65 and ground 60. As will be well understood by those skilled in the art, signals of an alternating nature produced by photocell 41 will be detected or rectified by the described arrangement so that there will appear at input 65 to amplifier 66 a unidirectional signal having a magnitude indicative of the magnitude of the alternating signal produced by the photocell 41.

In the same manner the output lead 62 leading from the anode of sensor 43 is connected through a series connected capacitor 75 and a diode or rectifier 76 to input 68 of the differential amplifier 66. A suitable resistor 80 is connected from lead 62 to ground 60. The remaining portion of the detector means for photocell sensor 43 includes a resistor 81 connected between the junction of capacitor 75 and diode 76 and ground 60; a resistor 82 connected between input 68 of amplifier 66 and ground 60; and a capacitor 83 connected between input 68 of amplifier 66 and ground 60.

When the sensors 41 and 43 are exactly centered in straddling relationship with respect to the spin axis 31 it follows that they will both be equidistant away from the spin axis 31 and (referring to FIGURE 6) each are producing substantially identical outputs (after detection) to their respective input terminals 65 and 68 of the differential amplifier 66. For this condition of equal signals being applied to the amplifier 66, it follows that the amplifier 66 will have a zero or null output which appears at a pair of output leads 86 and 87 thereof. If the pair of sensors 41 and 43 are laterally displaced away from such centered or first position so that one is closer to the spin axis than the other, then their outputs as appearing at terminals 65 and 68 will be unequal and a net output signal will be produced at the output leads 86 and 87 of the differential amplifier 66, the amplifier output having a sense and magnitude indicative respectively of the sense and magnitude of lateral displacement between the spin axis 31 and the radiation sensor assembly 35 (see FIGURE 6) (the lateral displacement being measured along the transverse axis defined by sensors 41 and 43). To explain, if sensor 41 is nearer the spin axis than sensor 43 then the signal appearing at input 68 of amplifier 66 will exceed the signal appearing at input 65 and accordingly the amplifier 66 will have an output of one sense. Further, if sensor 43 is nearer the spin axis than sensor 41 then the reverse situation would apply with the signal appearing at input 65 exceeding the magnitude in signal appearing at input 68 and the amplifier 66 would have an output of the opposite sense.

The output from differential amplifier 66 is applied through its output leads 86 and 87 to a servo amplifier 90 of any suitable type well known to those skilled in the art and its output in turn is applied through a suitable connection means 91 and 92 to the servomotor 25 which as above indicated is connected between gimbals 13 and 14. Dotted lines 93 and 94 schematically represent the mechanical connections between the servomotor 25 and the gimbal 14 of the pickoff 26 respectively as has been previously described in connection with FIGURE 1. The servo loop thus far described is arranged so that the error signal appearing at the output leads 86 and 87 of the differential amplifier causes the servomotor to drive the gimbal 14 with respect to gimbal 13 in a sense so as to decrease the error signal and so as to once again bring the sensors 41 and 43 back to a centralized straddling relationship with respect to the spin axis 31.

It will be understood that generally a spinning rotor will tend to remain fixed in inertial space in the absence of disturbing torques. It follows therefore that if the base means 11 rotates with respect to inertial space that the radiation sensing means 35 would tend to be moved out of register with the spin axis 31. With the present arrangement as soon as there is any such displacement, error signals are produced so as to reposition the gimbals to maintain the sensor 35 in register with the spin axis 31. The pickoff means 26 described would produce signals indicative of the total relative rotation between the base means 11 and the rotor 30.

The servo loop which includes the sensors 42 and 44 is generally identical to that for the sensors 41 and 43. Thus the anodes of sensors 42 and 44 are connected through rectifying or circuit means to the inputs of a suitable differential amplifier 95 which in turn is connected to a suitable servo amplifier 96 which in turn controls the servomotor 21 which, as described above, is connected between the base means 11 and the outer gimbal 13. The dotted lines 97 and 98 respectively schematically depict the connection between the servomotor 21 and the gimbal 13 and the pickoff 22. Another dotted line 99 depicts schematically the mechanical connection between gimbal 13 and the servomotor 25 as is described in considerable detail with respect to FIGURE 1. Thus actuation of servomotor 21 causes relative rotation between the base means 11 and the gimbal 13 about axis 18, this rotation being sensed by the pickoff means 22 which produces a signal indicative of such rotation.

It will be understood therefore that both servo loops described operate on a simultaneous basis so that the radiation sensing assembly 35 is servoed or slaved to remain in substantial register with the spin axis 31. The servo systems are designed so that the response thereof will be sufficiently rapid to permit the gimbals to follow or track the rotor.

While we have shown and described a specific embodiment of the invention, further modifications and improvements will occur to those skilled in the art. We desire it to be understood, therefore, that this invention is not limited to the particular form shown and we intend in the appended claims to cover all modifications which do not depart from the spirit and scope of this invention.

What we claim is:

1. A base; a support mounted by a gimbal means on said base for relative rotation therewith about a pair of mutually perpendicular axes; a substantially spherically shaped rotor universally supported by said support and adapted to be rotated about a spin axis; means for measuring relative rotation between said rotor (when spinning about said spin axis) and said support about a pair of axes mutually perpendicular to one another and to said spin axis, said rotation measuring means including a plurality of radiation sensors mounted on said support and adapted to sense radiation from said rotor, said rotor and said sensors being orientable and being normally oriented so that said sensors straddle a spin axis portion of the surface of said rotor, and said sensors producing signals indicative of relative displacement (transverse to the spin axis) of the sensing means away from the spin axis by being responsive to velocity of relative movement between the sensors and the portion of rotor surface viewed thereby; motor means connected to said gimbal means; and means for applying the signals produced by said sensors to said motor means so that said support and said sensors thereon are servoed to remain in substantial register with said spin axis portion of said surface of said rotor.

2. A base; a support mounted by a gimbal means on said base for relative rotation therewith about a pair of mutually perpendicular axes; a rotor universally supported by said support and adapted to be rotated about a spin axis; means for measuring relative rotation between said rotor (when spinning about said spin axis) and said support about a pair of axes mutually perpendicular to one another and to said spin axis, said rotation measuring means including radiation sensing means mounted on said support and adapted to sense radiation from said rotor, said rotor and said sensing means being orientable and being normally oriented so that said sensing means views a spin axis portion of the surface of said rotor, and said sensing means producing signals indicative of relative displacement (transverse to the spin axis) of the sensing means away from the spin axis by being responsive to a function of relative movement between the sensing means and the portion of rotor surface viewed thereby; motor means connected to said gimbal means; and means for applying the signals produced by said sensing means to said motor means so that said support and said sensing means thereon are servoed to remain in substantial register with said spin axis portion of said surface of said rotor.

3. A base; a support mounted by a gimbal means on said base for relative rotation therewith about a pair of mutually perpendicular axes; a substantially spherically shaped rotor universally mounted relative to said support and adapted to be rotated about a spin axis; means for measuring relative rotation between said rotor (when spinning about said spin axis) and said support about a pair of axes mutually perpendicular to one another and to said spin axis, said rotation measuring means including radiation sensing means positioned to rotate with said support and adapted to sense radiation from said rotor, said rotor and said sensing means being orientable and being normally oriented so that said sensing means views a pole portion of the surface of said rotor, and said sensing means producing signals indicative of relative displacement (transverse to the spin axis) of the sensing means away from the spin axis of a spinning rotor by being responsive to the velocity of relative movement between the sensing means and the portion of rotor surface viewed thereby; motor means connected to said gimbal means; and means for applying the signals produced by said sensing means to said motor means so that said sensing means is servoed to remain in substantial register with said pole portion of said surface of said rotor.

4. A base; a support mounted by a gimbal means on said base for relative rotation therewith about a pair of mutually perpendicular axes; a substantially spherically shaped rotor having a pole portion, said rotor being universally supported by said support and adapted to be rotated about a spin axis; means for measuring relative rotation between said rotor (when spinning about said spin axis) and said support about a pair of axes mutually perpendicular to one another and to said spin axis, said rotation measuring means including radiation sensing means mounted on said support and adapted to sense radiation from said rotor, said rotor and said sensing means being orientable and being normally oriented so that said sensing means views said pole portion of the surface of said rotor, and said sensing means producing signals indicative of relative displacement (transverse to the spin axis) of the sensing means away from the spin axis of a spinning rotor by being responsive to the velocity of relative movement between the sensing means and the portion of rotor surface viewed thereby; motor means connected to said gimbal means; means for applying the signals produced by said sensing means to said motor means so that said support and said sensing means thereon are servoed to remain in substantial register with said pole portion of said surface of said rotor; and means for measuring relative rotation between said gimbal means and said support and for producing signals indicative of such rotation.

5. A base; a support mounted by a pair of gimbals on said base for relative rotation therewith about a pair of mutually perpendicular axes; a substantially spherically shaped rotor adapted to be universally supported by said support and adapted to be rotated about a spin axis; means for measuring relative rotation between said rotor (when spinning about said spin axis) and said support about a pair of axes mutually perpendicular to one another and to said spin axis, said rotation measuring means including first and second radiation sensing means mounted adjacent one another on said support and adapted to sense radiation from said rotor, said rotor and said sensing means being orientable and being normally oriented so that said sensing means views a pole portion of the surface of said rotor, and said sensing means producing signals indicative of relative displacement (transverse to the spin axis) of the sensing means away from the spin axis of a spinning rotor by being responsive to the velocity of relative movement between the sensing means and the portion of rotor surface viewed thereby; first and second motor means connected respectively to said pair of gimbals; and means for applying the signals produced by said sensing means to said motor means so that said support and said sensing means thereon are servoed to remain in substantial register with said pole portion of said surface of said rotor.

6. A base; a support mounted by gimbal means on said base for relative rotation therewith about a pair of mutually perpendicular axes; a substantially spherically shaped rotor universally supported by said support and adapted to be rotated about a spin axis; means for measuring relative rotation between said rotor (when spinning about said spin axis) and said support about a pair of axes mutually perpendicular to one another and to said spin axis, said rotation measuring means including radiation sensing means mounted on said support and adapted to sense radiation from said rotor, said rotor and said sensing means being orientable and being normally oriented so that said sensing means views a pole portion of the surface of said rotor, and said sensing means producing signals indicative of relative displacement (transverse to the spin axis) of the sensing means away from the spin axis of a spinning rotor by being responsive to the velocity of relative movement between the sensing means and the portion of rotor surface viewed thereby; motor means connected to said gimbal means; and means for applying the signals produced by said sensing means to said motor means so that said support and said sensing means thereon are servoed to remain in substantial register with said pole portion of said surface of said rotor.

7. A support; a substantially spherically shaped rotor universally supported by said support and adapted to be rotated about a spin axis; means for measuring relative rotation between said rotor and said support about a pair of axes mutually perpendicular to one another and to said spin axis, said rotation measuring means including a plurality of radiation sensors mounted on said support and adapted to sense radiation from said rotor, said rotor and said sensors being orientable and being normally oriented so that said sensors straddle a spin axis portion of the surface of said rotor, and said sensors producing signals indicative of relative displacement (transverse to the spin axis) of the sensors away from the spin axis by being responsive to velocity of relative movement between the sensors and the portion of rotor surface viewed thereby.

8. A support; a reflective, substantially spherically shaped member mounted on said support and adapted for relative rotation therewith about a spin axis having a predetermined relation with said support; means for providing an indication of the relative rotational shift between said support and said spin axis about a second axis perpendicular to said spin axis, said indication means including, a source of light mounted on said support, said light illuminating at least a portion of said member, a pair of optical sensors mounted on said support and adapted to sense the light reflected from said member, said member and said sensors being normally oriented so that said sensors are substantially equidistant from said member and from said spin axis and are centered on a line perpendicular to both said spin axis and said second axis, said sensors producing signals whose magnitude is in positive relation to the velocity of relative movement between said sensors and said member, and means for determining the difference of the signals appearing at the outputs of said two sensors, said difference being indicative of the relative shift between said member and said support about said second axis.

9. A support; a reflective, substantially spherically shaped member mounted on said support and adapted for relative rotation therewith, about a spin axis having a predetermined relation with said support; means for providing an indication of the relative rotational shift between said support and said spin axis about a second axis perpendicular to said spin axis, said indication means including, a source of light mounted on said support, said light illuminating at least a portion of said member, an optical sensor mounted on said support and adapted to sense the light reflected from said member, said sensor producing signals whose magnitude varies in positive relation with the velocity of relative movement between said sensor and said member.

References Cited by the Examiner

UNITED STATES PATENTS

| | | | |
|---|---|---|---|
| 2,098,564 | 11/1937 | Carter et al. | 74—5 X |
| 2,534,824 | 12/1950 | Jones | 74—5.7 X |
| 2,948,813 | 8/1960 | Osborne | 74—5.47 |
| 2,959,060 | 11/1960 | Kunz | 74—5.6 |
| 3,071,976 | 1/1963 | Kunz | 74—5.6 |

BROUGHTON G. DURHAM, *Primary Examiner.*

T. W. SHEAR, *Assistant Examiner.*